Figure 1:
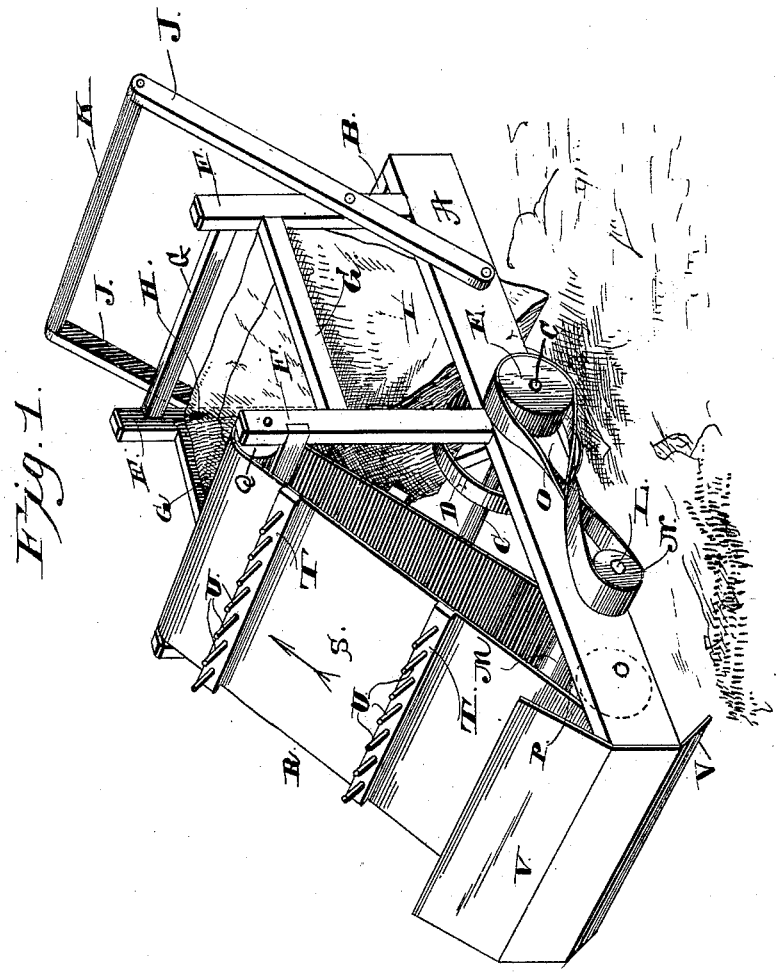

(No Model.) 2 Sheets—Sheet 1.

J. B. DETWEILER.
LAWN RAKE.

No. 401,822. Patented Apr. 23, 1889.

Witnesses.
M. Fowler
R. W. Bishop.

Inventor.
Joshua B. Detweiler.
By his Attorneys

N. PETERS, Photo-Lithographer, Washington, D. C.

(No Model.) 2 Sheets—Sheet 2.
J. B. DETWEILER.
LAWN RAKE.
No. 401,822. Patented Apr. 23, 1889.
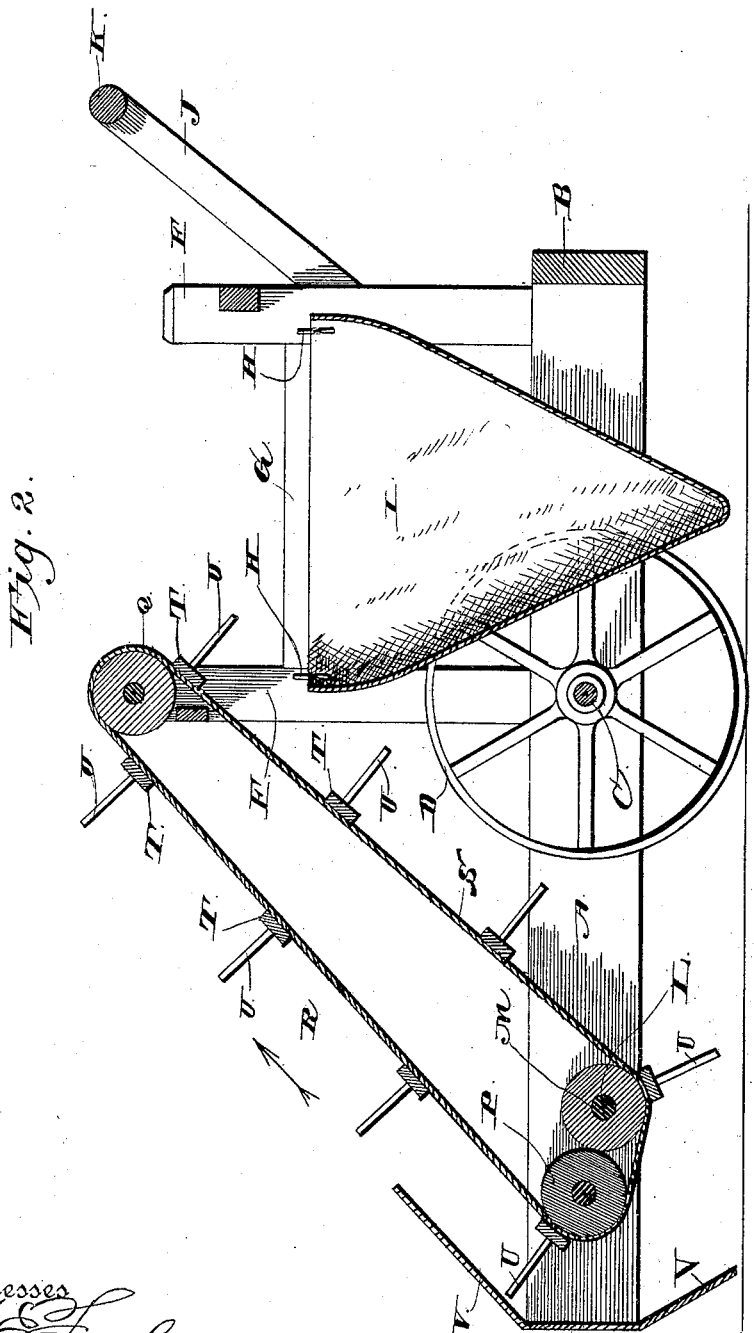
Witnesses
M. Fowler
R. W. Bishop.
Inventor,
Joshua B. Detweiler
By his Attorneys

UNITED STATES PATENT OFFICE.

JOSHUA B. DETWEILER, OF GOSHEN, INDIANA.

LAWN-RAKE.

SPECIFICATION forming part of Letters Patent No. 401,822, dated April 23, 1889.

Application filed November 7, 1888. Serial No. 290,192. (No model.)

*To all whom it may concern:*

Be it known that I, JOSHUA B. DETWEILER, a citizen of the United States, residing at Goshen, in the county of Elkhart and State of Indiana, have invented a new and useful Improvement in Lawn-Rakes, of which the following is a specification.

My invention relates to an improvement in lawn-rakes; and it consists in certain novel features hereinafter described and claimed.

In the drawings, Figure 1 is a perspective view of my improved machine. Fig. 2 is a longitudinal vertical section.

Referring to the drawings by letter, A A designate the main longitudinal beams of my improved machine, connected at their rear ends by a cross-beam, B, and having the axle C journaled between them at an intermediate point of their length. Upon the axle C, I secure the driving and carrying wheels D, one of which is secured rigidly to the axle and the other loosely secured thereto, so that the machine may be supported on said loose wheel and moved backward or turned without driving the endless rake. One end of the axle is projected beyond the beam A and has a band-pulley, E, mounted thereon.

On the upper sides of the beams A A, at and near the rear ends of the same, I erect the standards F F, which are connected by the transverse and longitudinal beams or bars G, as shown, and on their inner sides are provided with the hooks H, which support a bag, I, for the reception of the grass.

J J designate the handles, which are secured to the rear standards, F, and to the outer side of the beams A, and project upward and rearward therefrom, and have their rear ends connected by a cross-bar, K, which is grasped by the operator to push the machine over the ground and direct its course.

Between the beams A A, near the front ends of the same, I journal a shaft, L, having a roller, M, secured thereon between the beams, and having a pulley, N, secured on its end beyond the beam, the said pulley N being connected to the band-pulley E by means of the crossed belt O, as clearly shown in Fig. 1. Between the beams A A, near the front ends of the same, just in advance and a little above the roller M, is mounted a roller, P, and between the upper ends of the front standards, F, is journaled a similar roller, Q. An endless rake, R, is mounted on and drawn taut around the same. This endless rake consists of the endless apron or belt, of canvas or some similar material, S, and the slats or cross-bars T, secured thereto in any desired manner and carrying the rake-teeth U, as shown. These slats or cross-bars are arranged at such intervals apart that one of them is lowered into position to rake up the cut grass just as the preceding one starts on its upward movement.

V designates a shield, which is secured to the front ends of the beams A A, and is curved rearward from the upper and lower sides of the same, as clearly shown, so as to be substantially conformed to the path traveled by the lower end of the endless rake. This shield holds the grass upon the rakes until after they have reached the upper ply of the apron.

In operation the machine is pushed forward over the ground, as will be readily understood, and the rotation of the driving and carrying wheels will communicate motion to the endless rake through the pulleys E and N and the belt O. The endless rake will be thereby moved in the direction indicated by the arrows, and will take up the grass and carry it around to and empty it into the bag I.

It will thus be seen that I have provided an extremely simple and efficient rake, by means of which cut grass will be efficiently gathered from the lawns and deposited in the bag ready for storing or for carting away.

Having thus described my invention, what I claim, and desire to secure by Letters Patent, is—

The combination of the beams A, the front and rear standards F, erected thereon, the hooks H on the standards, the bags suspended on said hooks, the handles secured to the rear standards and the beams A, the roller Q in the front standards, the rotating axle, the roller M, the belt connecting the axle with the roller M, the endless rake moving over the rollers Q and M, and the shield secured to the front ends of the beams, as set forth.

In testimony that I claim the foregoing as my own I have hereto affixed my signature in presence of two witnesses.

JOSHUA B. DETWEILER.

Witnesses:
AARON S. ZOOK,
JOHN A. WITMER.